United States Patent [19]
Eichmüller et al.

[11] Patent Number: 5,961,028
[45] Date of Patent: Oct. 5, 1999

[54] SYSTEM FOR JOINING THIN-WALLED STEEL PARTS

[75] Inventors: Christian Eichmüller, München; Helmut Himmel, Dachau; Wilfried Willeke, Attendorn, all of Germany

[73] Assignees: Schmitz & Brill GmbH, Finnentrop, Germany; Bayerische Motoren Werke, Munich, Germany

[21] Appl. No.: 08/751,319

[22] Filed: Nov. 18, 1996

[30] Foreign Application Priority Data

Nov. 23, 1995 [DE] Germany .................. 195 43 603

[51] Int. Cl.[6] ............................................ B23K 31/02
[52] U.S. Cl. ...................................... 228/175; 228/189
[58] Field of Search .................................. 228/189, 138, 228/175, 182, 164

[56] References Cited

U.S. PATENT DOCUMENTS

| | | | |
|---|---|---|---|
| 1,556,420 | 10/1925 | Chandler | 228/189 |
| 3,264,727 | 8/1966 | Sloan | 228/189 |
| 4,607,781 | 8/1986 | Shwayder | 228/189 |
| 4,676,427 | 6/1987 | Constance | 228/189 |
| 4,678,112 | 7/1987 | Koisuka et al. | 228/138 |
| 4,735,355 | 4/1988 | Browning | 228/189 |
| 5,228,727 | 7/1993 | Tokutake et al. | 228/189 |

*Primary Examiner*—Samuel M. Heinrich
*Attorney, Agent, or Firm*—Herbert Dubno; Andrew Wilford

[57] ABSTRACT

A thin-walled steel first part is joined to a steel second part by first juxtaposing a metal plate with the first part, then securing the plate to the first part by soldering or laser welding, juxtaposing the second part with the plate, and fusion welding the second part to the plate.

9 Claims, 3 Drawing Sheets

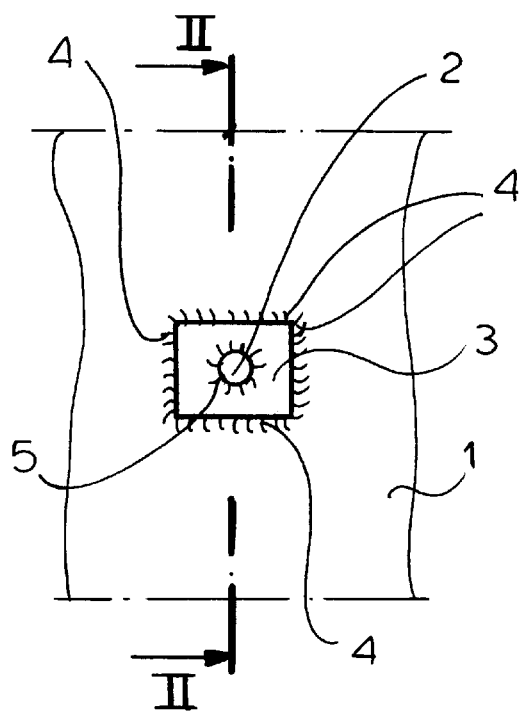
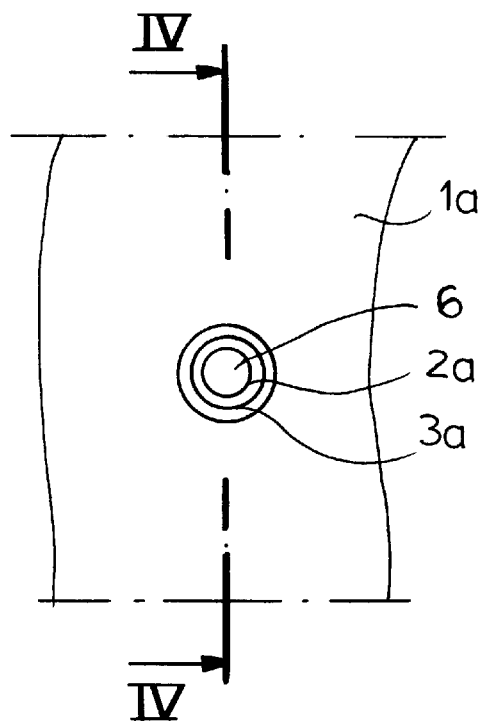
FIG.1
FIG.3
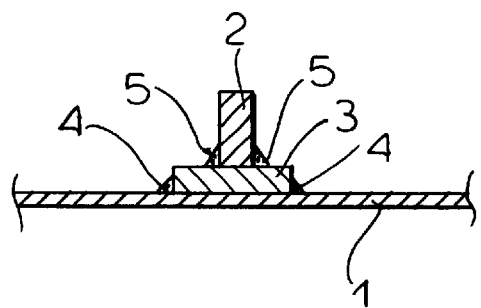
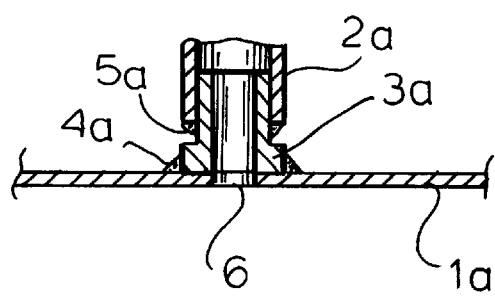
FIG.2
FIG.4

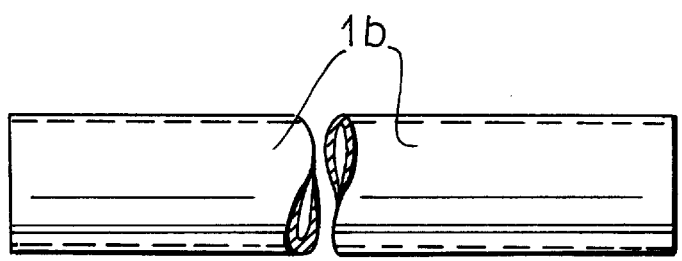
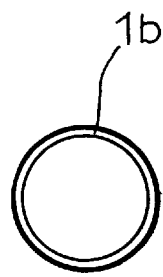
FIG.5  FIG.6
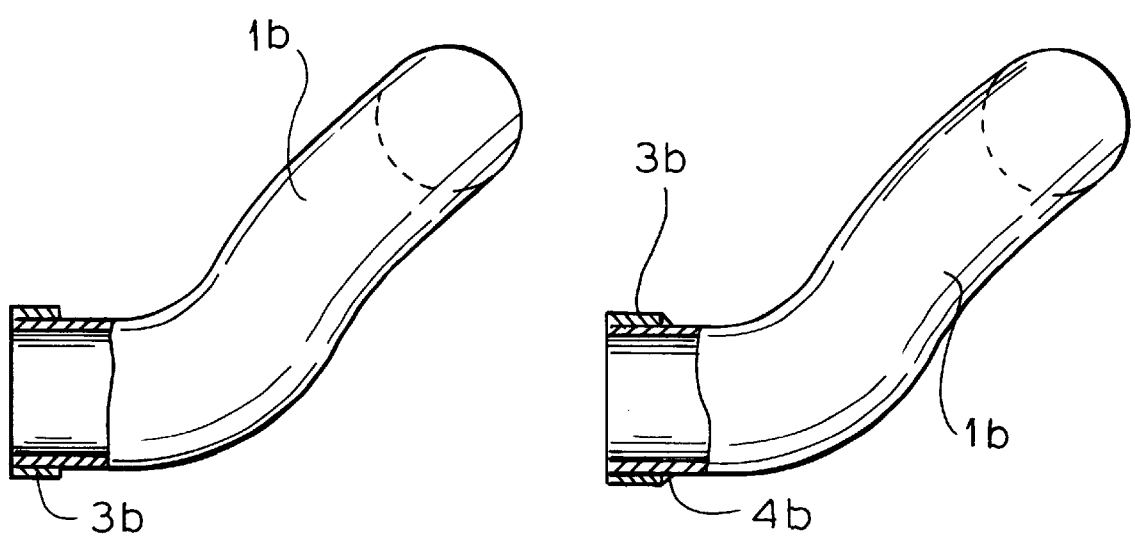
FIG.7  FIG.8

SYSTEM FOR JOINING THIN-WALLED STEEL PARTS

FIELD OF THE INVENTION

The present invention relates to the joining of thin-walled steel parts. More particularly this invention concerns the interconnection of steel parts of less than 1 mm thickness.

BACKGROUND OF THE INVENTION

It is a standard procedure when joining two metallic bodies to weld them together by the standard fusion-welding technique where the juxtaposed metallic workpieces are heated at their interface until one or both of them actually melts and bonds with the other workpiece. The resultant joint is extremely strong and works well even when, for instance one tube end is swaged out so it can fit over another tube end for fusion-welding thereto, although it normally somewhat reduces the thickness and strength of both the workpieces at the joint.

When however joining very thin workpieces less than 1 mm thick such a procedure leads often to an excessive weakening of the already thin material. The cause of this is the liquefied material of one of the workpieces that has been displaced to join with the other workpiece and the heating which can cause a metal to lose strength. The joint region is normally where stresses from vibration are most apparent, so this critical region is going to be weaker than the rest of the structure. Thus such construction normally leads to failure of the joint regions while the rest of the structure still has considerable service life left.

OBJECTS OF THE INVENTION

It is therefore an object of the present invention to provide an improved method of joining two metallic workpieces.

Another object is the provision of such an improved method of joining two metallic workpieces which overcomes the above-given disadvantages, that is which allows metal parts to be attached to thin steel sheeting, less than 1 mm thick, without weakening the support workpiece.

A further object is to provide an improved welded article with a metal part solidly secured by welding procedures to a thin stainless-steel sheet.

SUMMARY OF THE INVENTION

A thin-walled steel first part is joined to a steel second part according to the invention by first juxtaposing a metal plate with the first part, then securing the plate to the first part by soldering or laser welding, juxtaposing the second part with the plate, and fusion welding the second part to the plate.

Thus with this system soldering, which is here intended to cover brazing, or laser welding are used for the delicate job of joining the plate to the first part, so that in no way is the strength or thickness of the first part reduced. A standard fusion weld is employed to join the second part to the plate, as weakening is not relevant in this reinforced region.

The first part and plate are in accordance with the invention substantially planar where they engage each other and the second part is a stud. Normally all elements are of stainless steel. Alternately the first part is substantially planar and formed with a hole. The plate is a tubular nipple engaging the plate at the hole and the second part is a tube fitted to the nipple. In another arrangement the first and second parts are tubes and the plate is a ring. The ring is fitted over an end of the tube prior to soldering or laser-welding it thereto, and the tube end with the ring soldered to it is fitted into the second part before fusion welding it thereto. In this latter arrangement a plurality of such tube ends with such rings can be fitted into the second part before fusion welding them thereto. The tube end and the ring fitted to it are plastically deformed to fit the second part.

According to the invention the first part is secured to the plate by putting a solder between the first part and the plate and then heating the first part and plate to about 1180° C. The solder can be a copper-lead solder that fuses at about 1040° C. or a nickel-lead solder that fuses at about 1100° C. The first part and plate are deformed, for instance by internally pressurizing them while confining them in a die, prior to heating them.

The assembly according to the invention thus comprises a thin-walled steel first part, a steel second part, a metal plate between and engaging the first and second parts, a solder or laser-weld joint securing the plate to the first part, and a fusion weld securing the second part to the plate.

BRIEF DESCRIPTION OF THE DRAWING

The above and other objects, features, and advantages will become more readily apparent from the following description, reference being made to the accompanying drawing in which:

FIG. 1 is a top view of a weld joint according to the invention;

FIG. 2 is a section taken along line II—II of FIG. 1;

FIG. 3 is a top view of another weld joint according to the invention;

FIG. 4 is a section taken along line IV—IV of FIG. 3;

FIGS. 5 and 6 are side and end views of a tubing blank according to this invention;

FIGS. 7, 8, and 9 are side views of the tubing blank during subsequent stages of its deformation according to the invention;

SPECIFIC DESCRIPTION

Figure 9:
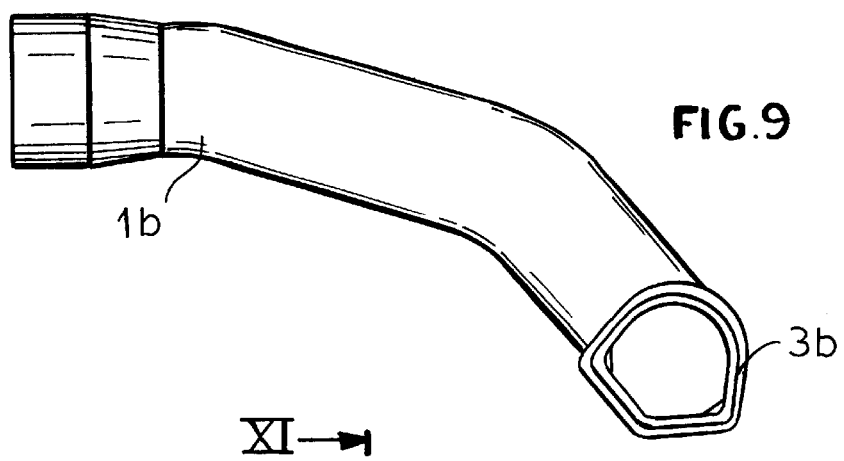
Figure 10:
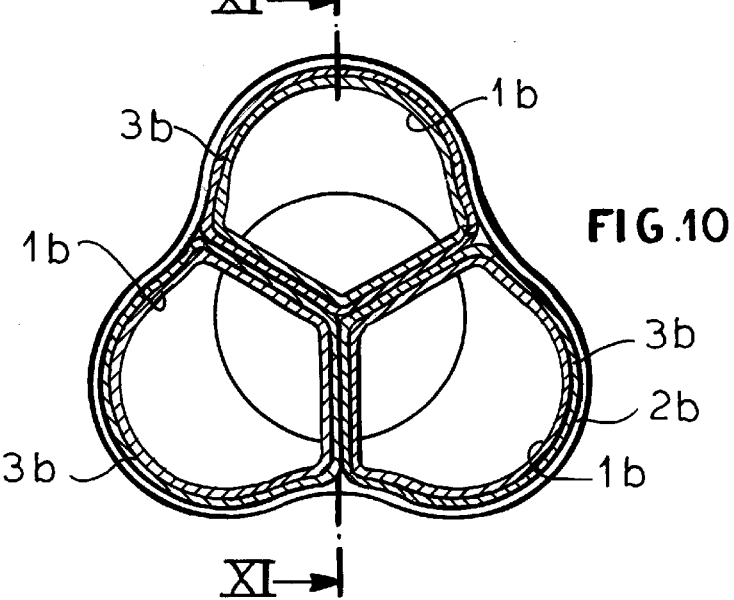
FIG. 10 is a cross section through a welded assembly using the tube of FIGS. 5 through 9 according to the invention.
Figure 11:
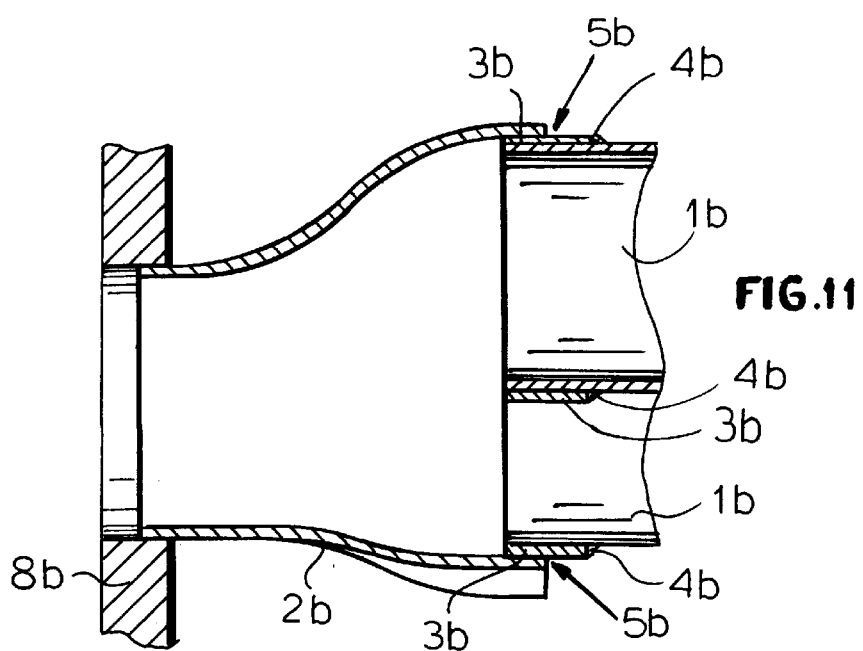
FIG. 11 is a section taken along line XI—XI of FIG. 10.

As seen in FIGS. 1 and 2 in order to secure a flat stainless-steel plate 1 less than 1 mm thick to a cylindrical stainless-steel stud 2, one interposes between them a small plate or pad 3 of thickness somewhat greater than 1 mm and secures it in place with a weld 4. The plate 1 can be part of a muffler assembly and the stud 2 can be a hanger bolt.

This weld 4 is produced by laser welding which is a very accurate process whereby the surfaces of the workpieces are excited greatly without being significantly fused, so that the excited surfaces stick together, or it is done by soldering or brazing, which is a type of soldering, whereby a metal (e.g. brass, lead, and/or tin) with a lower melting point than the two workpieces to be fused is melted and adhered to both of them at their interface. Thus the weld joint 4 is created without any substantial weakening of the support plate 1. On the other hand the parts 2 and 3 are joined together by a standard fusion weld 5 whereby either or both of the workpieces 2 and 3 are melted so that they flow and fuse together. The resultant assembly is extremely rugged.

In FIGS. 3 and 4 a plate workpiece 1a identical to that of FIG. 1 is formed with a hole 6 over which is fitted an intermediate piece 3a formed as a nipple for attachment of a third workpiece 2*a*. Welds 4*a* and 5*a* like the welds 4 and 5 secure the workpieces 1*a*, 2*a*, and 3*a* together.

In the system of FIGS. 5 through 11 an initially straight tube 1*b* shown in FIGS. 5 and 6 is bent by pressure deformation into a desired nonstraight shape and fitted at one end with a steel collar 3*b* as shown in FIG. 7. Then as shown in FIG. 8 the collar 3*b* is secured in place by a joint 4*b* formed by soldering with copper solder which fuses at 1140° C. FIG. 9 shows how the thus reinforced tube 1*b* is deformed at its end with the reinforcing ring 3*b* and annealed at about 1180° C. to dissipate stresses in it and make the solder joint 4*b*. Then three such tubes 1*b* are fitted into a common thin-walled collar 2*b* in turn fitted to an end flange 8. A conventional fusion weld 5*b* is formed between the collar 2*b* and the rings 3*b*. This assembly is usable for the exhaust manifold or exhaust piping of a motor vehicle.

We claim:

1. A method of joining a thin-walled steel first part to a thin-walled steel second part, the method comprising the steps of:

juxtaposing a metal plate with the first part;

securing the plate to the first part by soldering or laser welding;

juxtaposing the second part with the plate; and fusion welding the second part to the plate.

2. The joining method defined in claim 1 wherein the first part and plate are substantially planar where they engage each other and the second part is a stud.

3. The joining method defined in claim 1 wherein the first part is substantially planar and formed with a hole, the plate is a tubular nipple engaging the plate at the hole, and the second part is a tube fitted to the nipple.

4. The joining method defined in claim 1 wherein the first and second parts are tubes and the plate is a ring, the method further comprising the steps of:

fitting the ring over an end of the tube prior to soldering or laser-welding it thereto; and fitting the tube end with the ring soldered to it into the second part before fusion welding it thereto.

5. The joining method defined in claim 4 wherein a plurality of such tube ends with such rings are fitted into the second part before fusion welding them thereto.

6. The joining method defined in claim 4 wherein the tube end and the ring fitted to it are plastically deformed to fit the second part.

7. The joining method defined in claim 1 wherein the first part is secured to the plate by putting a solder between the first part and the plate and then heating the first part and plate to about 1180° C.

8. The joining method defined in claim 1 wherein the solder is a copper-lead solder that fuses at about 1040° C. or a nickel-lead solder that fuses at about 1100° C.

9. The joining method defined in claim 7, further comprising the step of deforming the first part and plate prior to heating them.

* * * * *